United States Patent
Connelly (10) Patent No.: US 12,380,642 B1
(45) Date of Patent: Aug. 5, 2025

(54) TECHNIQUES FOR PROVIDING PROPRIETARY SOLID MODELING TO AN OPEN-SOURCE INFRASTRUCTURE MODELING PLATFORM

(71) Applicant: Bentley Systems, Incorporated, Exton, PA (US)

(72) Inventor: Paul Connelly, Mertztown, PA (US)

(73) Assignee: Bentley Systems, Incorporated, Exton, PA (US)

( * ) Notice: Subject to any disclaimer, the term of this patent is extended or adjusted under 35 U.S.C. 154(b) by 212 days.

(21) Appl. No.: 18/213,588

(22) Filed: Jun. 23, 2023

Related U.S. Application Data (60) Provisional application No. 63/470,920, filed on Jun. 4, 2023.

(51) Int. Cl.
  *G06F 30/10* (2020.01)
  *G06F 9/445* (2018.01)
  *G06T 17/00* (2006.01)

(52) U.S. Cl.
  CPC .......... *G06T 17/00* (2013.01); *G06F 9/44521* (2013.01)

(58) Field of Classification Search
  CPC ........ G06F 30/00; G06F 16/212; G06F 30/13; G06F 2111/02; G06F 2111/20;
  (Continued)

(56) References Cited

U.S. PATENT DOCUMENTS 6,341,291 B1    1/2002  Bentley et al.
8,706,692 B1    4/2014  Luthra et al.
(Continued)

FOREIGN PATENT DOCUMENTS

CN    1825306 A    8/2006
CN    105912411 A   8/2016
(Continued)

OTHER PUBLICATIONS

Chinese Office Action for Chinese Application No. 201980067119.1 dated Jul. 30, 2024, pp. 1-24.
(Continued)

*Primary Examiner* — Hau H Nguyen
(74) *Attorney, Agent, or Firm* — Cesari and McKenna, LLP; James A. Blanchette (57) ABSTRACT

In example embodiments, a proprietary implementation of solid modeling is provided at run-time as a binary to an open-source infrastructure modeling platform. The binary includes functionality of a solid modeling module that manipulates and uses BReps that represent geometry of elements of an infrastructure model. When an application that utilizes the open-source infrastructure modeling platform requires solid modeling, it may have a backend module call an exposed function of a DLL that returns a pointer to the binary. The backend module uses the pointer to create a session, which may be divided into a number of individual partitions that each correspond to one of its individual threads. BReps may be assigned to individual partitions. When a thread requires BReps to be manipulated and/or used, the corresponding partition may be used to acquire the needed BReps, perform the solid modeling operations, and either return results or an error.

20 Claims, 6 Drawing Sheets

(58) Field of Classification Search
CPC ...... G06F 30/10; G06F 2111/04; G06T 17/00; G06T 2200/24; G06T 19/20; G06T 7/75; G06T 2210/04
See application file for complete search history.

(56) References Cited

U.S. PATENT DOCUMENTS

| | | |
|---|---|---|
| 8,719,229 B1 | 5/2014 | Awe et al. |
| 9,053,080 B2 | 6/2015 | Look et al. |
| 10,311,170 B2 | 6/2019 | Heidinger et al. |
| 11,100,703 B2 | 8/2021 | Connelly et al. |
| 11,113,847 B2 | 9/2021 | Connelly et al. |
| 11,645,296 B1 | 5/2023 | Bentley et al. |
| 2005/0198244 A1 | 9/2005 | Eilam |
| 2007/0021955 A1 | 1/2007 | Tolone et al. |
| 2007/0299937 A1 | 12/2007 | Winter et al. |
| 2008/0140732 A1 | 6/2008 | Wilson et al. |
| 2011/0113359 A1 | 5/2011 | Massey et al. |
| 2011/0126275 A1 | 5/2011 | Anderson et al. |
| 2011/0264678 A1 | 10/2011 | Mital et al. |
| 2012/0096070 A1 | 4/2012 | Bryzak |
| 2012/0284684 A1 | 11/2012 | Michaely et al. |
| 2014/0013099 A1 | 1/2014 | Sekiguchi et al. |
| 2014/0358860 A1 | 12/2014 | Wautier et al. |
| 2015/0229638 A1 | 8/2015 | Loo |
| 2015/0286558 A1 | 10/2015 | Bartlow et al. |
| 2016/0162363 A1 | 6/2016 | Letkeman |
| 2017/0123934 A1 | 5/2017 | Bentley |
| 2017/0220606 A1 | 8/2017 | Wang et al. |
| 2017/0277761 A1 | 9/2017 | Bentley et al. |
| 2018/0144016 A1 | 5/2018 | Bestfleisch et al. |
| 2019/0004925 A1 | 1/2019 | Buckingham et al. |
| 2019/0079958 A1 | 3/2019 | Bentley et al. |
| 2019/0081847 A1 | 3/2019 | Bentley et al. |
| 2019/0108245 A1 | 4/2019 | Bentley et al. |
| 2019/0354540 A1 | 11/2019 | Stigsen |
| 2022/0076503 A1 | 3/2022 | Connelly |
| 2023/0177229 A1* | 6/2023 | Marini ............... G06F 30/10 703/7 |

FOREIGN PATENT DOCUMENTS

| | | |
|---|---|---|
| CN | 106462639 A | 2/2017 |
| WO | WO-2014/193458 A1 | 12/2014 |

OTHER PUBLICATIONS

Chinese Search Report for Chinese Application No. 201980067119.1 dated Jul. 29, 2024, pp. 1-5.
"Notification of Transmittal of the International Search Report and the Written Opinion of the International Searching Authority, or the Declaration," International Filing Date: Oct. 1, 2019, International Application No. PCT/US2019/054017, Applicant: Bentley Systems, Incorporated, Date of Mailing: Jan. 27, 2020, pp. 1-13.
Scott, Tamara, "How to Use an API: Just the Basics," Retrieved from the Internet: <https://technologyadvice.com/blog/information-technology/how-to-use-an-api/>, Dec. 19, 2016, pp. 1-11.
U.S. Appl. No. 16/156,824, filed Oct. 10, 2018 by Ramanujam Raman et al. for Technique for Generating a Change Cache Database Utilized to Inspect Changes Made to a Repository, pp. 1-35.
U.S. Appl. No. 18/131,587, filed Apr. 6, 2023 by Keith A. Bentley et al. for Techniques for Decoupling Access to Infrastructure Models, pp. 1-27.
U.S. Appl. No. 18/204,771, filed Jun. 1, 2023 by Paul Connelly for Techniques for Providing Proprietary Tile-Based and/or Non-Tile-Based Graphics Processing to an Open-Source Infrastructure Modeling Platform, pp. 1-35.
Chinese Search Report for Chinese Application No. 201980082365.4 dated Jun. 12, 2023, pp. 1-2.

* cited by examiner

TECHNIQUES FOR PROVIDING PROPRIETARY SOLID MODELING TO AN OPEN-SOURCE INFRASTRUCTURE MODELING PLATFORM

RELATED APPLICATION

The present application claims the benefit of U.S. Provisional Patent Application No. 63/470,920 filed on Jun. 4, 2023 for "Techniques for Providing Proprietary Solid Modeling to an Open-Source Infrastructure Modeling Platform", the contents of which are incorporated by reference herein.

BACKGROUND

Technical Field

The present disclosure relates generally to modeling infrastructure, and more specifically to techniques for providing solid modeling to an open-source infrastructure modeling platform.

Background Information

Infrastructure typically refers to structures and facilities needed for the operation of an organization, company, community, country, or other entity, such as buildings, factories, plants, roads, railways, utility networks, and the like. As part of the design, construction and/or operation of infrastructure, it is often desirable to create infrastructure models. As used herein, the term "infrastructure model" refers to a 3D computer aided design (CAD) model of infrastructure. An infrastructure model may be a built infrastructure model (BIM) or digital twin of infrastructure. A BIM is a digital representation of infrastructure as it should be built in the real-world, providing a mechanism for visualization and collaboration. A digital twin is a digital representation of infrastructure as it is actually built in the real-world, and is often synchronized with information representing current status, working condition, position, or other qualities. An infrastructure model is typically composed of a number of individual elements. As used herein, the term "element" refers to a record that represents (i.e., "models," in a colloquial sense of the term) an individual entity within an infrastructure model. At least some elements represent spatial entities and correspond to physical portions of the infrastructure as it should be built, or as it is actually built, within the real-world.

Elements (or more specifically elements that represent spatial entities) typically include geometry that describes their spatial properties. Such geometry may be stored in a binary format, for example, as a binary "geometry stream" column of a database that maintains the infrastructure model. Since the geometry of different elements may have different levels of complexity, representing the geometry in the geometry stream may be more or less involved. Simple element geometry often may be represented as geometric primitives (i.e., simple geometric shapes, such as lines, boxes, cylinders, torii, extruded shapes, etc.). However, more complex element geometry (often referred to as "solids") may require a more complex representation. Manipulating and using such more complex representations is often referred to as "solid modeling"). While the word "solid" is used here, it should be understood that the element geometry need not always describe a solid body (e.g., it may alternatively describe a planer sheet body, a wire frame body, etc.). As such, in this context the terms "solids" and "solid modeling" should be interpreted broadly to include such other types of bodies as well.

One type of representation that is often used in solid modeling is the boundary representation body ("BRep"). A BRep describes the geometry of a body as a collection of connected surface elements, which represent the boundary between interior and external points. Such boundary representation is typically built from geometric definitions (e.g., surfaces, curves, and points) and topology (e.g., faces, edges and vertices) describing how they are connected.

It may be necessary to manipulate and use BReps as part of visualizing, modifying, performing analysis on, or otherwise interacting with an infrastructure model. For example, to render a view of an infrastructure model the geometry of each element within the visible region of the infrastructure model typically must be converted to a low-level representation of graphics consumable by a graphics processing unit (GPU). The GPU may consume the low-level representation of graphics and produce a display on a screen. When the geometry of an element is represented as a BRep, the conversion may involve producing faceted meshes (or simply facets) from the BRep (i.e., BRep faceting). Likewise, in other types of workflows, different types of manipulation and use of BReps may be involved, for example, to modify elements, determine properties of elements, compare elements, or perform other tasks.

Manipulation and use of BReps (e.g., as part of rendering a view of an infrastructure model or other workflow) typically requires complex software. Such software may define the storage format of the BReps, encode and decode BReps, perform queries about BReps, perform caparisons between BReps, etc.

There is a growing trend for software functionality to be offered as open-source software that allows users to use, study, and change the underlying source code. This trend extends to infrastructure modeling software functionality. For example, infrastructure modeling functionality (e.g., BIM or digital twin functionality) may be offered as an open-source platform (e.g., an open-source library) that includes modules for creating, querying, modifying, and displaying infrastructure models. Such an open-source platform may be used by third parties to develop their own infrastructure modeling applications. An example of such an open-source platform is the iTwin.js library for developing infrastructure digital twin applications available from Bentley Systems, Inc.

An open-source platform may be designed with open-source software that manipulates and use BReps. However, implementing such functionality in open-source software may have shortcomings. For example, since users are permitted to change open-source software, there is the potential for them to introduce incompatibility with other software. Likewise, since users are permitted to study the underlying source code of open-source software, there is the potential for revealing proprietary technology, security vulnerabilities, or other types of information that may be better kept confidential.

While one could simply provide a fully proprietary platform instead of an open-source platform, such an approach similarly has shortcomings. Open-source software often achieves quicker market adoption as it may offer lower starting costs, more flexible software development processes, robust community-driven support, and other advantages. Further, whatever the approach used, it is important to ensure efficient execution, such that the platform does not consume excessive computing resources (i.e., processing or memory resources).

Accordingly, there is a need for improved techniques for providing solid modeling to an open-source infrastructure modeling platform.

SUMMARY

In various embodiments, a proprietary implementation of solid modeling is provided at run-time as a binary to an open-source infrastructure modeling platform. An open-source repository from which the infrastructure modeling platform is built includes a backend module and definitions of the interface of a solid modeling module from a private repository. The open-source repository lacks code for the underlying implementation of the solid modeling module.

In operation, when an application that utilizes the open-source infrastructure modeling platform requires solid modeling, the backend module may call an exposed function of a dynamically loaded module (DLL) that returns a pointer to a binary implementation of the solid modeling module. The backend module uses the pointer to create a session of the solid modeling module, which may be divided into a number of individual partitions that each correspond to its individual threads of the backend module. BReps may be assigned to individual partitions. When a thread requires BReps to be manipulated and/or used, the corresponding partition may be used to acquire any needed BReps, perform the solid modeling operations, and either return results or an error.

By dividing the functionality between the backend module built from the open-source repository and the solid modeling built from the private repository, many of the advantages of open-source software may be achieved while avoiding some of the shortcomings. Further, through use of partitions efficient multithread operation may be supported.

In one example embodiment, a technique is provided for solid modeling within an open-source infrastructure modeling platform. A backend module of the open-source infrastructure modeling platform executing on a client device or one or more cloud computing devices calls a function of a DLL to obtain a pointer to an implementation of a solid modeling module built from a private repository that implements functionality to manipulate and use BReps that represent geometry of elements of an infrastructure model. The backend module utilizes the pointer to initialize the solid modeling module, wherein initialization includes creating a session of the solid modeling module, the session is divided into a number of individual partitions, and BReps are each assigned to one of the individual partitions. The backend module utilizes an interface of the solid modeling module to request one or more partitions of the session of the solid modeling module to perform solid modeling operations on one or more BReps assigned to the respective partitions and return results. Results produced by the partitions are received and a display to a user updated.

It should be understood that a variety of additional features and alternative embodiments may be implemented other than those discussed in this Summary. This Summary is intended simply as a brief introduction to the reader and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which.

DETAILED DESCRIPTION

The following detailed description describes example embodiments. Any references to items in the singular should be understood to include items in the plural, and vice versa, unless explicitly stated or otherwise clear from the context. Grammatical conjunctions are intended to express any and all disjunctive and conjunctive combinations of conjoined clauses, sentences, words, and the like, unless otherwise stated or clear from the context. For example, the term "or" should be understood to mean "and/or." Any recitation of ranges of values are not intended to be limiting, are provided as examples only, and are not intended to constitute a limitation on the scope of the described embodiments. Further, any recitation of ranges should be interpreted as referring individually to any and all values falling within the range, unless otherwise indicated, and each separate value within such a range should be treated as if it were individually recited. Terms of approximation such as "about," "approximately," "substantially" or the like, should be construed as referring to an allowance for deviation that is appreciated by one of ordinary skill in the art to still permit satisfactory operation for the corresponding use, function or purpose, or the like. No language in the description should be construed as indicating an element is a necessary or essential aspect of the disclosure.

Figure 1:
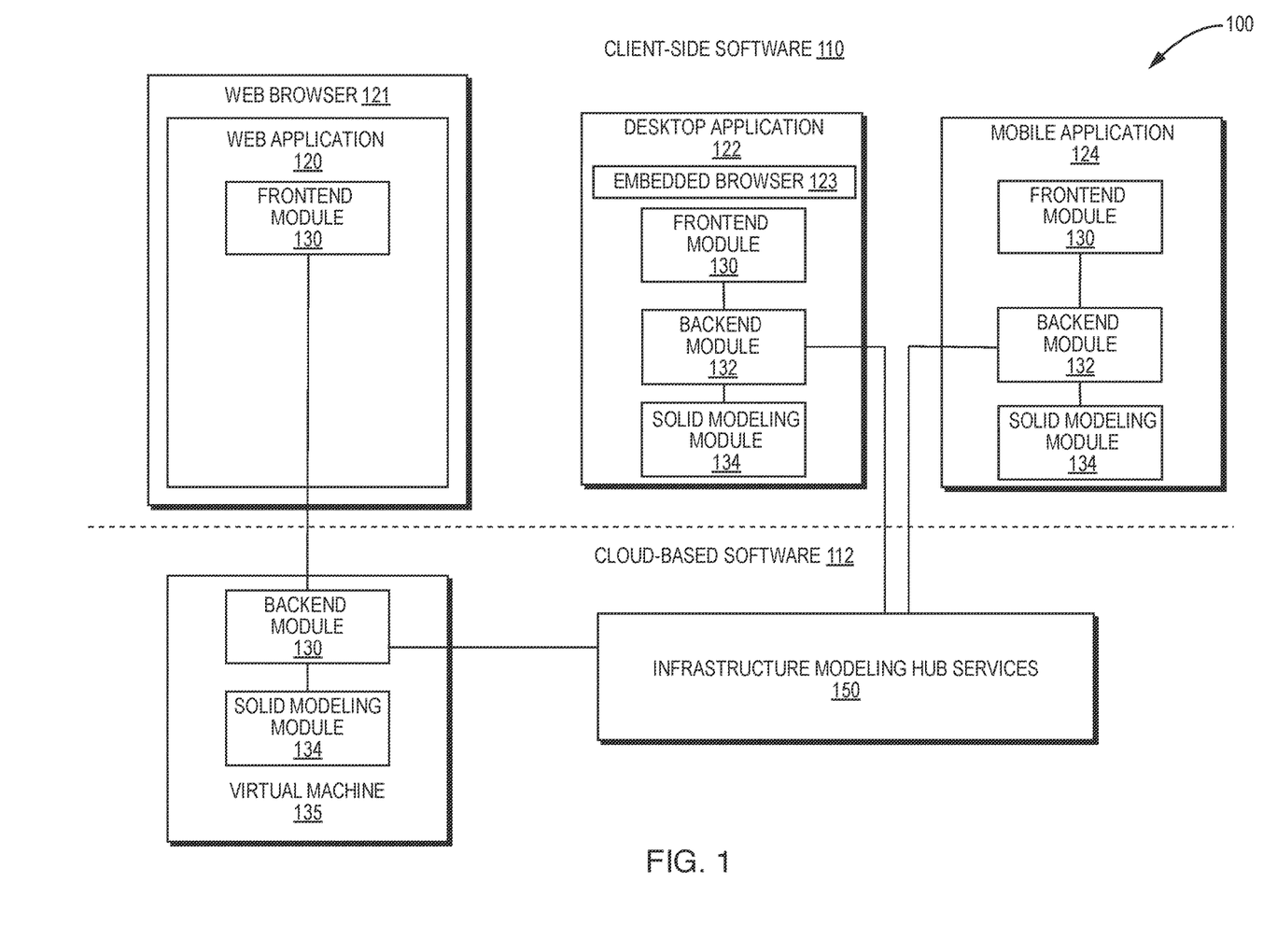
FIG. 1 is a high-level block diagram showing use of an open-source infrastructure modeling platform.

FIG. 1 is a high-level block diagram 100 showing use of an open-source infrastructure modeling platform. In one embodiment, the open-source infrastructure modeling platform is the iTwin.js library available from Bentley Systems, Inc. The block diagram 100 may be divided into client-side software 110 that executes on one or more computing devices local to an end-user (collectively "client devices") and cloud-based software 112 that executes on one or more computing devices remote from the end-user (collectively "cloud computing devices") accessible via a network (e.g., the Internet). The client-side software 110 may include web infrastructure modeling applications 120 that operate within a virtual environment (e.g., a browser sandbox) provided by a web browser 121 (e.g., a Chrome® web browser), desktop infrastructure modeling applications 122 that operate under a desktop operating system (e.g., a Windows® operating system) and include an embedded web browser (e.g., a Chromium® browser) 123, and mobile infrastructure modeling applications 124 that operate under a mobile operating system (e.g., an iOS® or Android® operating system) that include a script engine (e.g., a JavaScript engine) 125. The infrastructure modeling applications 120, 122, 124 may utilize open-source frontend modules 130 and backend modules 132 built from an open-source repository of the platform and a proprietary solid modeling module 134 built from a private repository, the functions of which are discussed in more detail below.

For each type of application 120, 122, 124, the frontend modules 130 are shown as part of client-side software 110. For desktop applications 122 and mobile applications 124, the backend modules 132 and solid modeling modules 134 are shown as part of client-side software 110, resident on a client device and accessible to the frontend module 130 via inter-process communication (IPC) or function calls. For web applications 120, the backend modules 132 and solid modeling modules 134 are shown as part of cloud-based software 112, executing on a virtual machine 135 on a cloud computing device and communicating with the frontend module 130 via remote procedure calls (RPCs) over Hyper-Text Transfer Protocol Secure (HTTPS). It should be understood that in alternative embodiments, frontend modules 130, backend modules 132 or solid modeling modules 134 may be disposed in a variety of different locations, and the arrangement shown in FIG. 1 is merely an example. Further, it should be understood that in alternative embodiments, multiple frontend modules 130 may interact with the same backend module 132 and/or solid modeling module 134, and there need not be a one-to-one correspondence between a frontend module 130, backend module 132 and solid modeling module 134.

Infrastructure modeling services 150 may be at the core of the cloud-based software 112. Such services software may provide centralized management and synchronization support for infrastructure models. Infrastructure modeling services 150 may interact with a number of other services (not shown) in the cloud that perform information management and support functions. For example, information management services may manage asset data, project data, reality data, Internet of Things (IoT) data, codes, and other functionality.

Working with infrastructure modeling services 150, the open-source frontend modules 130 and backend modules 132, and the proprietary solid modeling modules 134 of applications 120, 122, 124 may operate to enable a user to access, modify, display, and otherwise interact with infrastructure models. The frontend modules 130 may be primarily concerned with user interaction, information presentation and the like. They may access data for such tasks by making requests to the backend modules 132.

The backend modules 132 may be primarily concerned with servicing requests from the frontend modules 130 and performing task related to administration, data synchronization, interacting with components of infrastructure models such as elements, working with local file systems and the like. To perform such tasks the backend modules may operate a number of threads, including a main thread and additional threads (e.g., worker threads) that may be accessed from a thread pool. Certain threads may be dedicated to performing specific tasks (e.g., a faceter thread) as discussed in more detail below.

The solid modeling modules 134 may be primarily concerned with performing solid modeling operations on one or more BReps and providing results to the backend modules 132. The solid modeling module 134 may be designed as a kernel, and functions of its interface may represent entry points into the kernel. A running instance of the solid modeling module (kernel) 134 may be referred to as a "session." There can only be one session active for an application 120, 122, 124 at any given time. A session may be started or stopped explicitly. A session may be divided into independent subdivisions referred to as "partitions." Each partition may be assigned to a respective thread. Individual BReps may belong to a single partition at a time, and a thread may only invoke operations upon BReps that belong to its partition. A BRep may be initially assigned to the partition that created it, and later may be explicitly transferred from one partition to another to facilitate operations.

At runtime, a backend module 132 may call an exposed function of a DLL that returns a pointer to a binary implementation of the solid modeling module 134 (a proprietary binary). Using the pointer, a session is created, individual partitions formed as needed. When a thread requires BReps to be manipulated and/or used, its corresponding partition acquires the needed BReps, performs the solid modeling operations, and either returns results or an error. Any changes made to the BReps as part of their manipulation and/or use may be recorded as transactions that can be rolled backward or forward. The transactions of each partition may be maintained independently. If an error occurs, an exclusion may be set that blocks entry by any thread except the one that produced the error. To unblock entry, the offending thread may roll back transactions to a state preceding the error and then clear the exclusion.

Figure 2A:
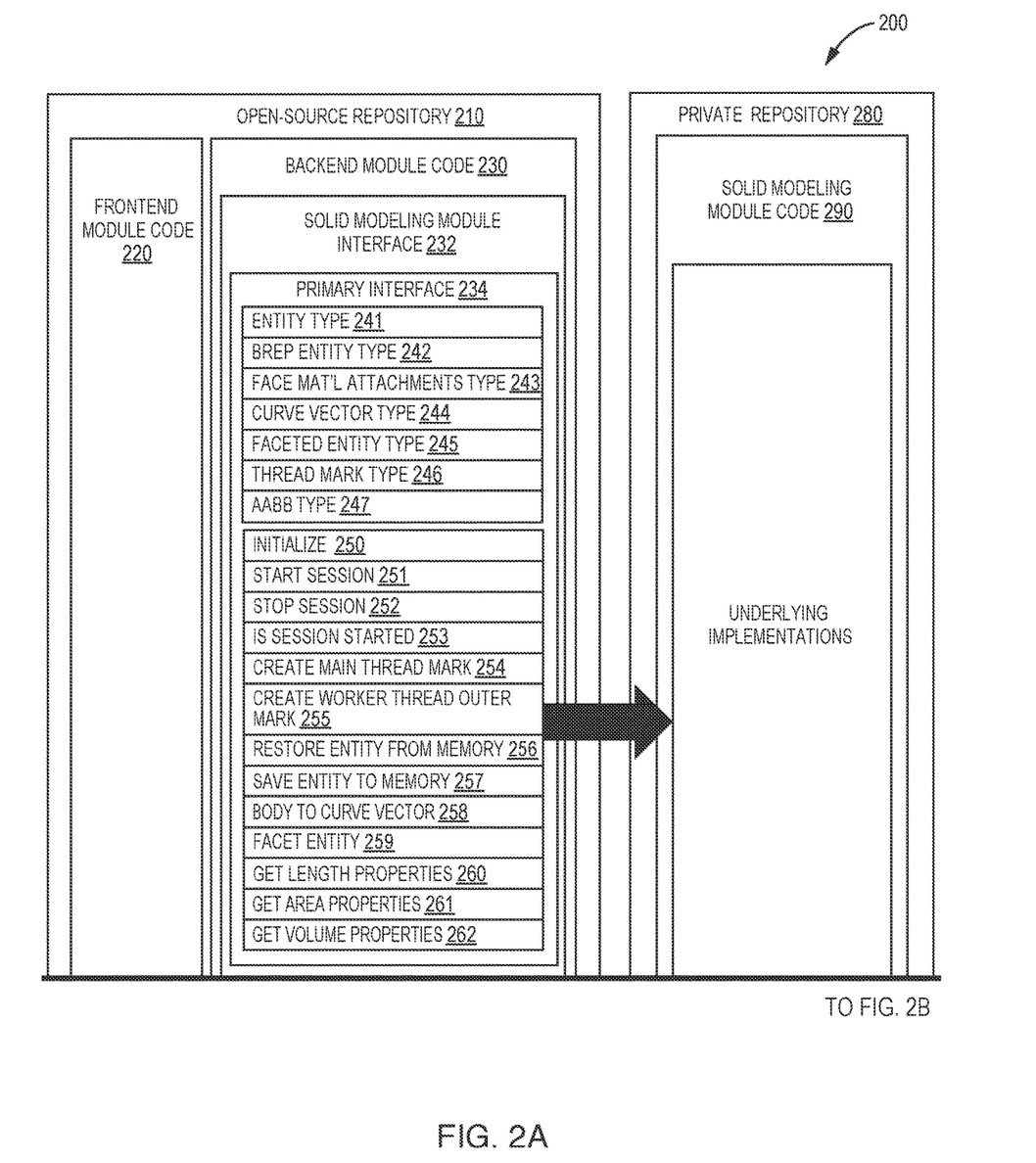
FIGS. 2A and 2B are is a block diagram illustrating an example open-source repository and private repository and code components that may be maintained therein.
Figure 2B:
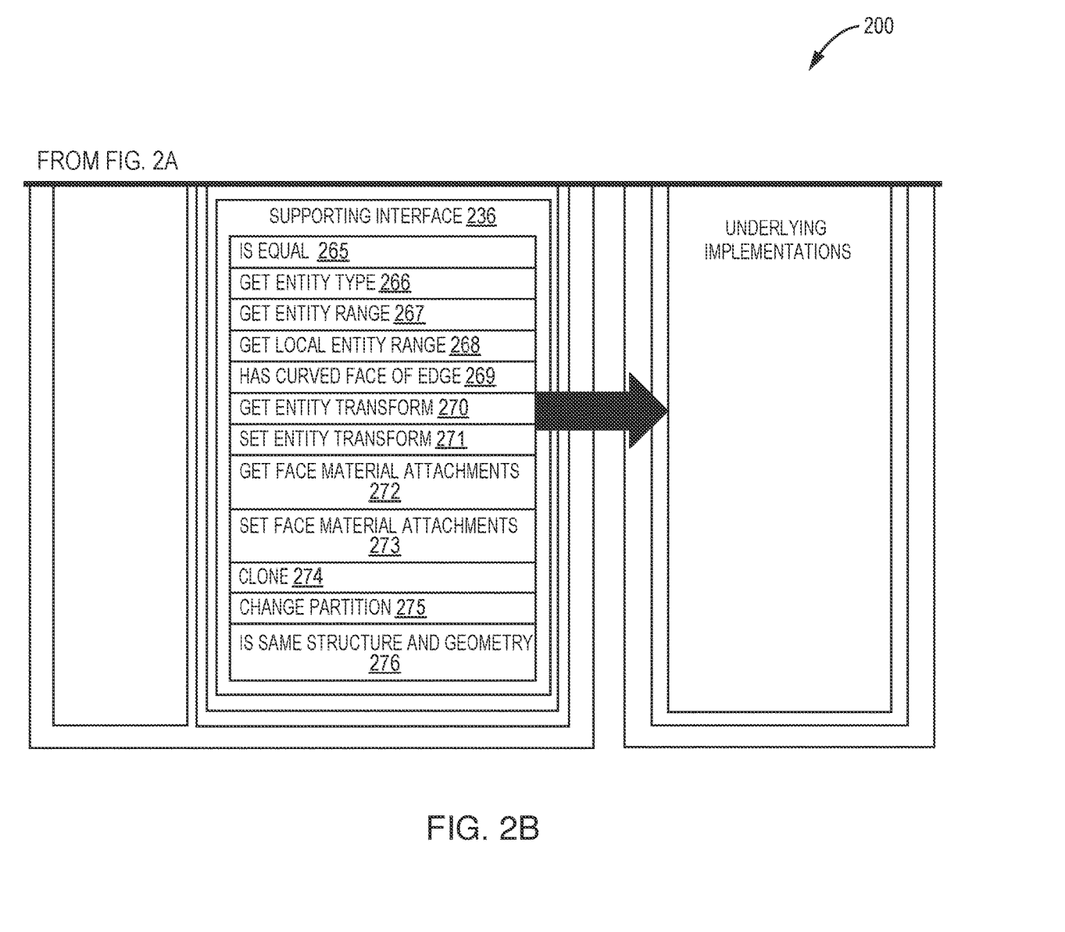

As mentioned above, a frontend module 130 and backend module 132 may be built from code of an open-source repository, and a solid modeling 134 may be built from code of a private repository, maintained on a client-side or cloud-based computing device. FIGS. 2A and 2B are a block diagram 200 illustrating an example open-source repository 210 and private repository 280 and code components that may be maintained therein. The open-source repository 210 may hold frontend module code 220 and backend module code 230. The private repository 280 may hold solid modeling module code 290. It should be understood that a variety of other code (not shown) may also be held in the repositories 210, 280 until built into binaries. Further, while certain interfaces, types, operations, and implementations of objects are discussed below, it should be understood that the frontend module code 220, backend module code 230 and solid modeling module code 290 may support a wide variety of additional interfaces, types, operations, and implementations of objects (not shown).

Pertinent to the present disclosure, the backend module code 230 may include a solid modeling module interface 232. The solid modeling module interface 232 may be divided into a primary interface 234 that provides access to core operations applicable to multiple BReps and a supporting interface 236 that provides access to operations pertaining to a specific BRep.

The primary interface 234 may define a number of concrete types, including an Entity Type type 241, a BRep Entity type 242, a Face Material Attachments type 243, a Curve Vector type 244, a Faceted Entity type 245, a Thread Mark type 246, and an Axis-Aligned Bounding Box (AABB) type 247.

The Entity Type type 241 is a concrete type that indicates a type of body of a specific BRep. For example, the type of body may be a solid (i.e. a body including at least one solid region), a planar sheet (i.e. a body including a connected set of faces having edges that are shared by a maximum of two faces), a wire frame (i.e. a body including a connected set of edges having vertices that are shared by a maximum of two edges), or invalid (i.e. a body that is no longer in existence or no longer compliant, for example, because it has been extracted or consumed by a Boolean operation).

The BRep Entity type 242 is a concrete type that maintains a description of a specific BRep. A BRep Entity may belong to exactly one partition at any given time. The thread associated with that partition may invoke any operation upon the BRep Entity. Any other thread may only invoke an operation to transfer the BRep Entity from the owning thread's partition to the other thread's partition.

The Face Material Attachments type 243 is a concrete type that maps rendering material properties to individual faces of a specific BRep. A BRep may be associated with symbology that describes material properties (e.g., color, transparency, and/or material). By specifically mapping material properties to individual faces, these may be overridden for those faces. A material may be specified by the ID of an element (e.g., a material element) of the infrastructure model that defines the material's appearance.

The Curve Vector type 244 is a concrete type that maintains a collection of curve primitives. When the Entity Type of a BRep is a planar sheet or wire frame, geometry of the BRep may be extracted to a collection of curve primitives. When this occurs, the curve primitives may be stored using the Curve Vector type 244.

The Facetted Entity type 245 is a concrete type that maintains faceted meshes that are an approximation of geometry and symbology. When the Entity Type of a BRep is a planer sheet or solid, geometry and symbology of the BRep may be simplified to a faceted mesh may be stored using the Facetted Entity type 245. Each mesh may have material properties as described in a Face Material Attachments.

A Thread Mark type 246 is a concrete type that serves as an indication that a session is in progress, or a partition has been allocated. It may be allocated by operations when they are invoked and deleted when the they are finished.

The AABB type 247 is a concrete type that describes a cuboid volume fully enclosing the volume of a BRep with faces aligned to axes of a coordinate system.

The primary interface 234 may also have a number of operations including an Initialize operation 250, a Start Session operation 251, a Stop Session operation 252, an Is Session Started operation 253, a Create Main Thread Mark operation 254, a Create Worker Thread Outer Mark operation 255, a Restore Entity from Memory operation 256, a Save Entity to Memory operation 257, a Body to Curve Vector operation 258, a Facet Entity operation 259, a Get Length Properties operation 260, a Get Area Properties operation 261, and a Get Volume Properties Operation 262. While the operations 250-262 are shown in FIGS. 2A and 2B in the backend module code 230 of the open-source repository 210, it should be understood that the implementation of the objects corresponding to the operations are proprietary and maintained in the solid modeling module code 290 of the private repository 280.

The Initialize operation 250 configures the solid modeling module 134 so its functionality can be used. It may accept two directories: an asset directory that contains version files for the solid modeling module 134 and a working directory in which temporary files can be written to record transactions within a partition. The Initialize operation 250 is involved once during an application's execution, prior to any other operations being invoked.

The Start Session operation 251 starts a session. It may be invoked by a main thread at any time after the Initialize operation 250, but only one session may be active at any time.

The Stop Session operation 252 stops a session. It may be invoked by the main thread at any time prior to its termination.

The Is Session Started operation 253 polls whether a session is active. Since only one session may be active at a time, the Is Session Started operation 253 may be invoked by the main thread to determine whether a Start Session operation 251 may be invoked.

The Create Main Thread Mark operation 254 allocates thread-local storage and initializes an error handler and returns a Thread Mark. It may be invoked by the main thread prior to invocation of operations 255-262 discussed below. Thread-local storage may be used by all threads. The error handler may respond to errors occurring within the solid modeling module 134 by clearing exclusions or throwing exceptions. Typically, the main thread invokes the Create Main Thread Mark operation 254 shortly after invoking the Start Session operation 251, and deletes the resulting Thread Mark just prior to invoking the Stop Session operation 252.

The Create Worker Thread Outer Mark operation 255 allocates a partition for a thread and returns a Thread Mark. It may be invoked by any thread other than the main thread prior to invocation of operations 256-262 discussed below. Subsequent operations create and manipulate BReps only within the partition. Typically, a thread invokes the Create Worker Thread Outer Mark operation 255 shortly after thread creation and deletes the resulting Thread Mark just prior to thread termination. However, a long-running thread may instead invoke the Create Worker Thread Outer Mark operation 255 just before beginning interactions with the solid modeling module 134, and delete the resulting Thread Mark after completing those interactions.

The Restore Entity from Memory operation 256 produces a description of a specific BRep (BRep Entity) that may be used in conjunction with the supporting interface 236 to access operations for that specific BRep, or a null result. It may take as input a binary representation of the BRep (e.g., in a proprietary format used by the solid modeling module 134), decode the binary representation, and return a corresponding BRep Entity that provides access. If the binary representation cannot be decoded, it may instead return a null result.

The Save Entity to Memory operation 257 produces a binary representation of a specific BRep (e.g., in a proprietary format used by the solid modeling module 134) that may be saved (e.g., in an element's geometry stream) for later use. It may take as input a description of the specific BRep (BRep Entity). In such manner, it may perform the inverse of the Restore Entity from Memory operation 256.

The Body to Curve Vector operation 258 produces a collection of curve primitives (i.e., a Curve Vector) from a specific BRep or a null result. It may take as input a description of the specific BRep (BRep Entity). If the Entity Type of a BRep is not a planar sheet or wire frame, and as such its geometry cannot be simplified to a collection of curve primitives, a null result may be returned. This operation may be used to obtain a simplified representation of a BRep's geometry that can be used as input to analytical routines that do not require the full use of the solid modeling module's capabilities, for example, production of graphics to be displayed on a display device.

The Facet Entity operation 259 produces a faceted mesh that approximates the geometry and symbology of a specific BRep or a null result. It may take as input a description of the specific BRep (BRep Entity). If the BRep has Face Material Attachments, a mesh may be produced for each material attachment. Otherwise, a single mesh may be produced. If the Entity Type of a BRep is not a planer sheet or solid, and as such its geometry cannot be approximated as a faceted mesh, a null result may be returned. This operation may be used to obtain a simplified representation of a BRep's geometry that can be used as input to analytical routines that do not require the full use of the solid modeling module's capabilities, for example, production of graphics to be displayed on a display device.

The Get Length Properties operation 260 computes a length or perimeter and centroid of a specific BRep that is (i.e., has an Entity Type of) a planer sheet or wire body. It may take as input a description of the specific BRep (BRep Entity).

The Get Area Properties operation 261 computes an area, perimeter and centroid of a specific BRep that is (i.e., has an Entity Type of) a planer sheet or solid. It may take as input a description of the specific BRep (BRep Entity).

The Get Volumes Properties operation 262 computes a volume, area and centroid of a specific BRep that is (i.e., has an Entity Type of) a solid. It may take as input a description of the specific BRep (BRep Entity).

The supporting interface 236 may have a number of operations including an Is Equal operation 265, a Get Entity Type operation 266, a Get Entity Range operation 267, a Get Local Entity Range operation 268, a Has Curved Face or Edge operation 269, a Get Entity Transform operation 270, a Set Entity Transform operation 271, a Get Face Material Attachments operation 272, a Set Face Material Attachments operation 273, a Clone operation 274, a Change Partition operation 275 and an Is Same Structure and Geometry operation 276. While the operations 265-276 are shown in FIGS. 2A and 2B in the backend module code 230 of the open-source repository 210, it should be understood that the implementation of the objects corresponding to the operations are maintained in the solid modeling module code 290 of the private repository 280.

The Is Equal operation 265 produces a Boolean that indicates whether an input BRep (described by an input BRep Entity) refers to the same body as the specific BRep for which the operation is available.

The Get Entity Type operation 266 produces the type of body (an Entity Type) of the specific BRep for which the operation is available.

The Get Entity Range operation 267 produces a cuboid volume (an AABB) fully enclosing the volume of the specific BRep for which the operation is available in a world coordinate system used by the infrastructure model.

The Get Local Entity Range operation 268 produces a cuboid volume (an AABB) fully enclosing the volume of the specific BRep for which the operation is available in a local coordinate system of the body.

The Has Curved Face or Edge operation 269 produces a Boolean that indicates whether any non-planer face or non-linear edge exists within the specific BRep for which the operation is available. This information may be used in producing graphics. For example, if curved faces or edges are present, it may be desirable to produce multiple graphics representations of the body at different levels of detail.

The Get Entity Transform operation 270 discloses a 3D linear transform (including a combination of scaling, rotation and/or translation) to be applied to the body represented by the specific BRep for which the operation is available to transform it from a local coordinate system to a world coordinate system used by the infrastructure model.

The Set Entity Transform operation 271 sets the 3D linear transform (including a combination of scaling, rotation and/or translation) to be applied to the body represented by the specific BRep for which the operation is available to transform it from a local coordinate system to a world coordinate system used by the infrastructure model.

The Get Face Material Attachments operation 272 discloses any material attachments assigned to faces of the specific BRep for which the operation is available.

The Set Face Material Attachments operation 273 sets material attachments to be assigned to faces of the specific BRep for which the operation is available.

The Clone operation 274 produces a copy of the specific BRep for which the operation is available.

The Change Partition operation 275 transfers the specific BRep for which the operation is available into the partition of the invoking thread. This may enable the invoking thread to perform other operations upon it (and prevent the previously owning thread from performing operations upon it).

The Is Same Structure and Geometry operation 276 compares input geometry and topology of an input BRep (described by an input BRep Entity) to the specific BRep for which the operation is available. It may also take as input an error tolerance and produce a Boolean that indicates whether the geometry and topology of the input BRep (described by an input BRep Entity) is within the error tolerance of the specific BRep.

Figure 3:
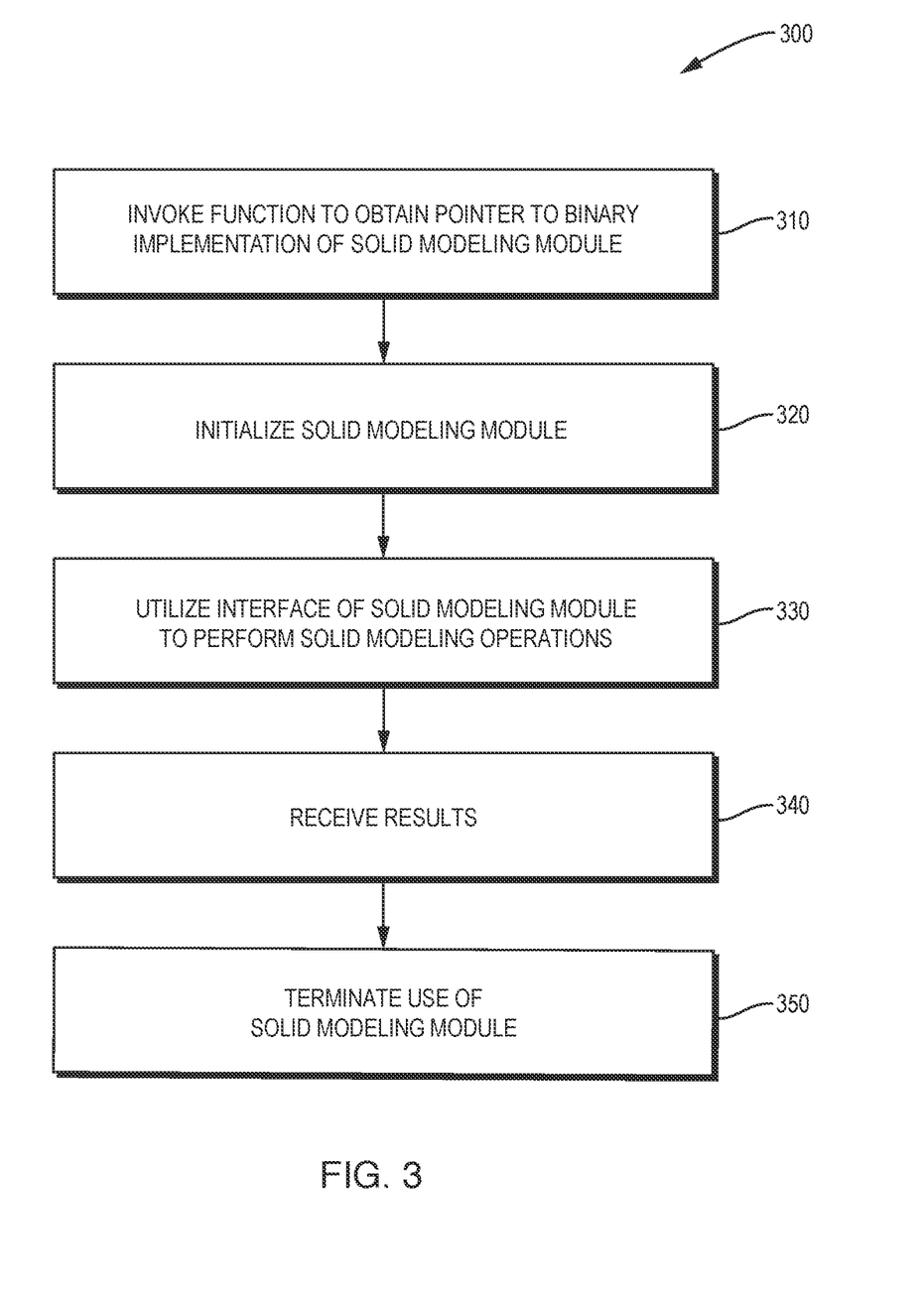
FIG. 3 is a flow diagram of an example sequence of steps for solid modeling within an open-source infrastructure modeling platform, wherein a proprietary implementation of solid modeling is provided as a binary at run-time.

FIG. 3 is a flow diagram of an example sequence of steps 300 for solid modeling within an open-source infrastructure modeling platform, wherein a proprietary implementation of solid modeling is provided as a binary at run-time. At step 310, a backend module 132 invokes a function of a DLL to obtain a pointer to a binary implementation of the solid modeling module 134 built from a private repository. The pointer may be stored by the backend module 132 until the backend module terminates.

At step 320, the backend module 132 utilizes the pointer to initialize the solid modeling module 134. Initialization may include creating a session of the solid modeling module, wherein the session is divided into a number of individual partitions corresponding to threads, and BReps are each assigned to one of the individual partitions.

At step 330, the backend module 132 utilizes an interface of the solid modeling module to request one or more partition of the session of the solid modeling module to perform solid modeling operations on one or more BReps assigned to the respective partitions and return results. One example of solid modeling operations may be operations to produce graphics for display to a user.

At step 340, the backend module 132 receives the results produced by the partitions of the session. At least some of the results may be passed on to a frontend module 130 to update a display to a user. For example, where the operations are to produce graphics, the graphics may be provided to a frontend module 130 and displayed thereby to a user.

At step 350, the backend module 132 may terminate use of the solid modeling module 134. Termination may involve deleting partitions and ending the session.

Figure 4:
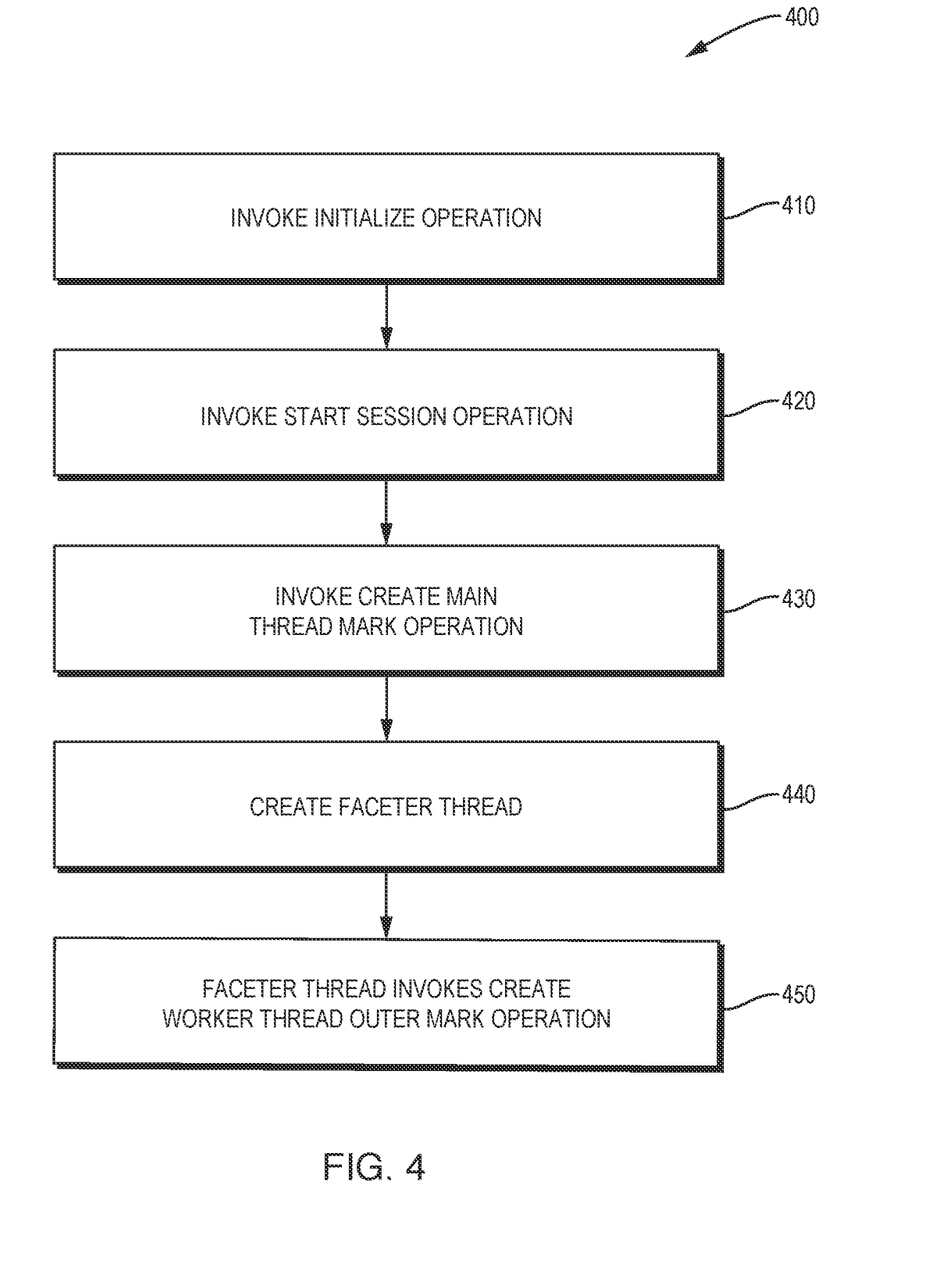
FIG. 4 is a flow diagram of an example sequence of steps for initialization, which may be performed as part of FIG. 3.

FIG. 4 is a flow diagram of an example sequence of steps 400 for initialization, which may be performed as part of step 320 of FIG. 3. Such steps 400 may be adapted to the operation of producing graphics for display to a user. At step 410, a backend module invokes the Initialize operation 250 to configure the solid modeling module 134 so its functionality can be used. At step 420, the backend module invokes the Start Session operation 251 to start a session. The session will endure for the lifetime of the application to which the backend module 134 belongs. At step 430 the backend module 134 invokes the Create Main Thread Mark operation 254 to allocate thread-local storage and initialize an error handler, and assigns the returned Thread Mark to a global variable. At step 440, the backend module creates a worker thread (referred to hereinafter as a "faceter thread") dedicated to the task of producing facets from BReps. The faceter thread will endure for the lifetime of the application to which the backend module 134 belongs. At step 450, the faceter thread invokes the Create Worker Thread Outer Mark operation 255 that allocates a partition for the faceter thread and assigns the returned Thread Mark to a local variable. Such partition may exist up until termination of the faceter thread (usually just before termination of the application).

Figure 5:
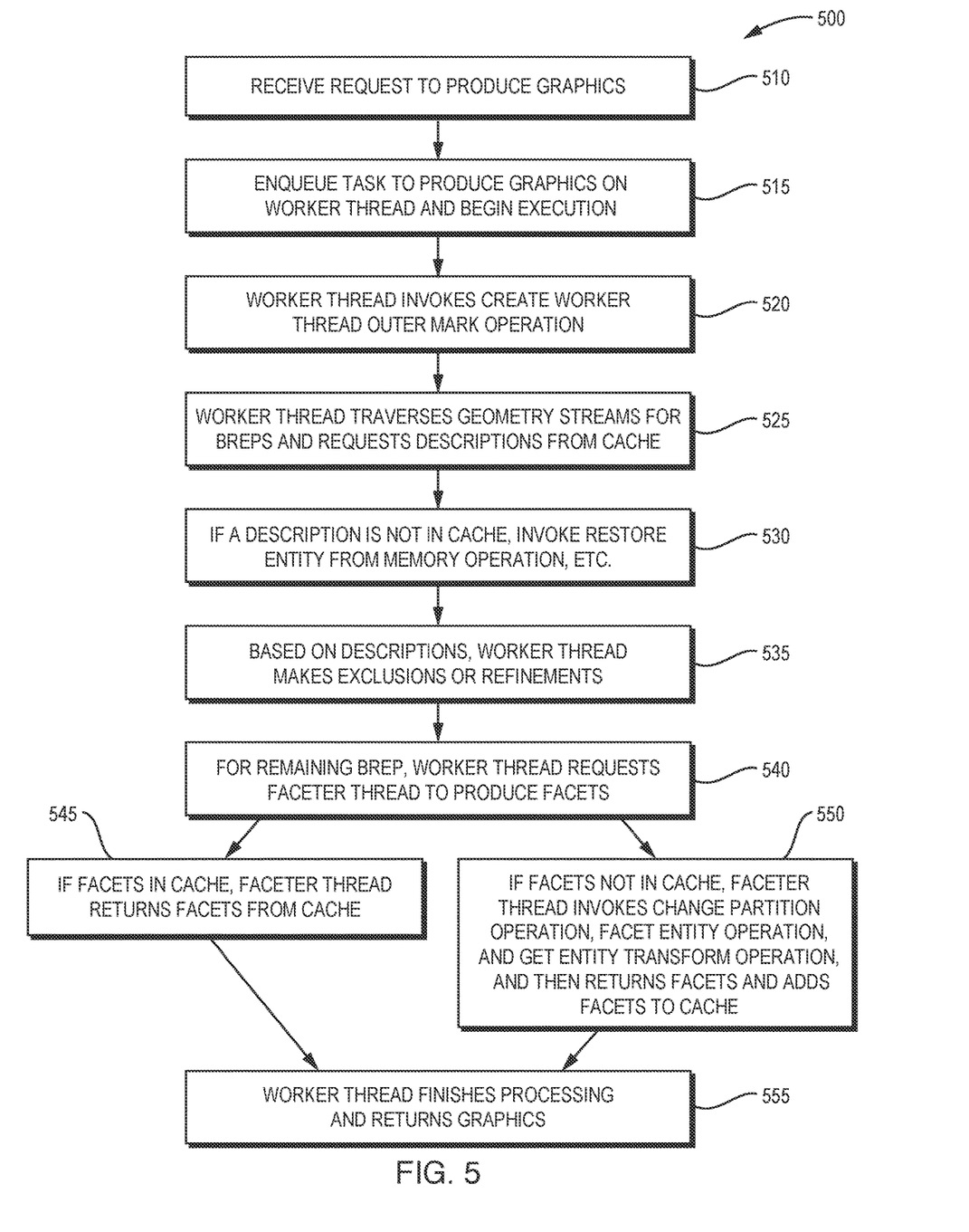
FIG. 5 is a flow diagram of an example sequence of steps for using a solid modeling module to produce graphics for display to a user, which may be performed as part of FIG. 3.

FIG. 5 is a flow diagram of an example sequence of steps 500 for using a solid modeling module 134 to produce graphics for display to a user, which may be performed as part of step 340 of FIG. 3. BRep faceting used in producing graphics may be quite slow. A cache may be employed to avoid repeating this task unnecessarily. The cache may identify individual BReps by an ID computed from the ID of the element and an index within the element's geometry stream. It may store a description (e.g., metadata) of each BRep, for example, its AABB, Entity Type, whether it Has Curved Face or Edge, and whether it has Face Material Attachments.

At step 510, a backend module 132 receives a request from a frontend module 130 to produce graphics (e.g., for a tile). Producing graphics for a tile may involve producing meshes from the geometry streams of all elements intersecting a particular volume of space of an infrastructure model. At step 515, the backend module 132 enqueues a task to produce graphics onto a worker thread, which then begins executing the task. At step 520, the worker thread invokes the Create Worker Thread Outer Mark operation 255 to allocate thread-local storage and initialize an error handler, and assigns the returned Thread Mark to a global variable. At step 525, the worker thread traverses the geometry streams of elements (e.g., elements within the tile's volume), and when the worker thread encounters a BRep in one of the geometry streams, requests a description (e.g., metadata) of the BRep from the cache. At step 530, if a description for a BRep is not in the cache, the worker thread invokes the Restore Entity from Memory operation 256 to produces a description, which may involve use of the Get Entity Type operation 266, Get Entity Range operation 267, Has Curved Face or Edge operation 269, and Get Face Material Attachments operation 272. At step 535, based on the description (e.g., metadata) of each BRep, the worker thread may make exclusions or refinements. For example, if the volume of the BRep is small (e.g., more than a predetermined amount smaller than a tile's volume), the thread may ignore the BRep as being too small to visibly contribute. Likewise, if the BRep has curved faces or edges, the thread may indicate that refinement to a higher level of detail is needed. At step 540, for any remaining BReps, the worker thread requests the faceter thread produce facets for the BRep. At step 545, if facets are already present in the cache, the faceter thread returns the facets from the cache. Otherwise, at step 550, the faceter thread invokes the Change Partition operation 275 to transfer the BRep to its own partition, invokes the Facet Entity operation 259 to produce facets, invokes the Get Entity Transform operation 270 to obtain a transform from local coordinates to world coordinates, applies the transform to the facets, and returns the facets and also adds them to the cache for future reuse. At step 555, the worker thread finishes processing elements, and returns graphics (e.g., for the tile). As part of this, the partition may be deleted.

In summary, techniques are provided that supply a proprietary implementation of solid modeling as a binary at run-time for use in an open-source infrastructure modeling platform. It should be understood that a wide variety of adaptations and modifications may be made to the techniques to suit various implementations and environments. While it is discussed above that aspects of the techniques can be implemented by specific software executing on specific hardware, it should be understood that the techniques may also be implemented by different software, different hardware, or various different combinations thereof. Software may include instructions in a high-level programming language or low-level programming language that may be stored and compiled or interpreted to run on hardware. For example, instructions may be stored on a non-transitory electronic device readable medium and when executed on one or more processors may be operable to perform the above techniques.

It should be understood that the ordering of any method steps discussed above may be changed to suit various situations or requirements. Absent an explicit indication to the contrary, the order of steps described above may be modified such that a subsequent step occurs before a preceding step, or in parallel to such step.

Above all, it should be understood that the above descriptions are meant to be taken only by way of example. Numerous variations, additions, omissions, and other modifications will be apparent to one of ordinary skill in the art, and such variations, additions, omissions, and other modifications should be considered within the scope of this disclosure. Thus, while example embodiments are shown and described, it will be apparent to those skilled in the art that changes and modifications may be made therein without departing from the spirit and scope of this disclosure.

What is claimed is:

1. A method for solid modeling within an open-source infrastructure modeling platform, comprising:
    calling, by a backend module of the open-source infrastructure modeling platform executing on a client device or one or more cloud computing devices, a function of a dynamically loaded module (DLL) to obtain a pointer to an implementation of a solid modeling module built from a private repository that implements functionality to manipulate and use boundary representation bodies (BReps) that represent geometry of elements of an infrastructure model;
    utilizing, by the backend module, the pointer to initialize the solid modeling module, wherein initialization includes creating a session of the solid modeling module, the session is divided into a number of individual partitions, and BReps are each assigned to one of the individual partitions;
    utilizing, by the backend module, an interface of the solid modeling module to request one or more partitions of the session of the solid modeling module to perform solid modeling operations on one or more BReps assigned to the respective partitions and return results; and
    receiving the results produced by the partitions and causing a frontend module of the open-source infrastructure modeling platform to update a display to a user.

2. The method of claim 1, wherein each partition of the session of the solid modeling module corresponds to an individual thread of the backend module.

3. The method of claim 1, wherein the interface of a solid modeling module includes a primary interface that provides access to operations applicable to multiple BReps and a supporting interface that provides access to operations pertaining to a specific BRep.

4. The method of claim 3, wherein the primary interface includes one or more types selected from the group consisting of:

an Entity Type type that indicates a type of body of a specific BRep;

a BRep Entity type that maintains a description of the specific BRep;

a Face Material Attachments type that maps rendering material properties to individual faces of the specific BRep;

a Curve Vector type that maintains a collection of curve primitives;

a Facetted Entity type that maintains faceted meshes that are an approximation of geometry and symbology;

a Thread Mark type that serves as an indication that a session is in progress, or a partition has been allocated; and an Axis-Aligned Bounding Box (AABB) type that describes a cuboid volume fully enclosing a volume with faces aligned to axes of a coordinate system.

5. The method of claim 3, wherein the primary interface includes one or more operations selected from the group consisting of:

an Initialize operation that configures the solid modeling module so its functionality can be used;

a Start Session operation that starts a session;

a Stop Session operation that stops a session;

an Is Session Started operation that polls whether a session is active;

a Create Main Thread Mark operation that allocates thread-local storage and initializes an error handler;

a Create Worker Thread Outer Mark operation that allocates a partition for a thread;

a Restore Entity from Memory operation that produces a description of a specific BRep that may be used in conjunction with the supporting interface to access operations on that specific BRep;

a Save Entity to Memory operation that produces a binary representation of the specific BRep that may be saved for later use;

a Body to Curve Vector operation that produces a collection of curve primitives from the specific BRep;

a Facet Entity operation that produces a faceted mesh that is an approximation of geometry and symbology of the specific BRep;

a Get Length Properties operation that computes a length or perimeter and centroid of the specific BRep when it is a planer sheet or wire body;

a Get Area Properties operation that computes an area, perimeter and centroid of the specific BRep when it is a planer sheet or solid; and a Get Volumes Properties operation that computes a volume, area and centroid of the specific BRep when it is a solid.

6. The method of claim 5, wherein the supporting interface includes one or more operations selected from the group consisting of:

an Is Equal operation that produces a Boolean that indicates whether an input BRep refers to the same body as a specific BRep;

a Get Entity Type operation that produces the type of body of the specific BRep;

a Get Entity Range operation that produces a cuboid volume fully enclosing the volume of the specific BRep in a world coordinate system used by the infrastructure model;

a Get Local Entity Range operation that produces a cuboid volume fully enclosing the volume of the specific BRep in a local coordinate system;

a Has Curved Face or Edge operation that produces a Boolean that indicates whether any non-planer face or non-linear edge exists within the specific BRep;

a Get Entity Transform operation that discloses a transform to be applied to a body represented by the specific BRep to transform it from a local coordinate system to the world coordinate system;

a Set Entity Transform operation that sets the transform to be applied to the body represented by the specific BRep to transform it from the local coordinate system to the world coordinate system;

a Get Face Material Attachments operation that discloses any material attachments assigned to faces of the specific BRep;

a Set Face Material Attachments operation that sets material attachments to be assigned to faces of the specific BRep;

a Clone operation that produces a copy of the specific BRep;

a Change Partition operation that transfers the specific BRep into the partition of an invoking thread; and an Is Same Structure and Geometry operation that compares input geometry and topology of an input BRep (described by an input BRep Entity) to the specific BRep.

7. The method of claim 6, wherein initialization further includes:

invoking the Initialize operation;

invoking the Start Session;

invoking the Create Main Thread Mark operation;

creates a faceter thread dedicated to the tasks of producing facets from BReps; and invoking, by the faceter thread, the Create Worker Thread Outer Mark operation.

8. The method of claim 6, wherein the solid modeling operations involve producing graphics for the one or more BReps at least in part by:

requesting a description of each of the one or more BRep from a cache;

if the description for a given BRep is not in the cache, invoking the Restore Entity from Memory operation;

requesting a faceter thread to produce facets for the one or more BReps;

if facets are already present in the cache, returning, by the faceter thread, facets for a given tread from the cache or, otherwise, invoking the Change Partition operation to transfer the BRep to a faceter thread's partition, invoking the Facet Entity operation to produce facets, invoking the Get Entity Transform operation to obtain a transform from local coordinates to world coordinates, and adding the facets to the cache; and returnsing graphics including the facets.

9. A non-transitory electronic device readable medium having instructions stored thereon for an open-source infrastructure modeling platform, the instructions when executed by one or more processors of one or more computing devices are operable to:

call a function of a dynamically loaded module (DLL) to obtain a pointer to an implementation of a solid modeling module built from a private repository that implements functionality to manipulate and use boundary representation bodies (BReps) that represent geometry of elements of an infrastructure model;

utilize the pointer to initialize the solid modeling module, wherein initialization includes creating a session of the solid modeling module, the session is divided into a number of individual partitions, and BReps are each assigned to one of the individual partitions;
utilize an interface of the solid modeling module to request one or more partitions of the session of the solid modeling module to perform solid modeling operations on one or more BReps assigned to the respective partitions and return results; and
receive the results produced by the partitions and cause update a display to a user.

10. The non-transitory electronic device readable medium of claim 9, wherein each partition of the session of the solid modeling module corresponds to an individual thread of a backend module.

11. The non-transitory electronic device readable medium of claim 9, wherein the interface of a solid modeling module includes a primary interface that provides access to operations applicable to multiple BReps and a supporting interface that provides access to operations pertaining to a specific BRep.

12. The non-transitory electronic device readable medium of claim 11, wherein the primary interface includes one or more types selected from the group consisting of:
an Entity Type type that indicates a type of body of a specific BRep;
a BRep Entity type that maintains a description of the specific BRep;
a Face Material Attachments type that maps rendering material properties to individual faces of the specific BRep;
a Curve Vector type that maintains a collection of curve primitives;
a Facetted Entity type that maintains faceted meshes that are an approximation of geometry and symbology;
a Thread Mark type that serves as an indication that a session is in progress, or a partition has been allocated; and
an Axis-Aligned Bounding Box (AABB) type that describes a cuboid volume fully enclosing a volume with faces aligned to axes of a coordinate system.

13. The non-transitory electronic device readable medium of claim 11, wherein the primary interface includes one or more operations selected from the group consisting of:
an Initialize operation that configures the solid modeling module so its functionality can be used;
a Start Session operation that starts a session;
a Stop Session operation that stops a session;
an Is Session Started operation that polls whether a session is active;
a Create Main Thread Mark operation that allocates thread-local storage and initializes an error handler;
a Create Worker Thread Outer Mark operation that allocates a partition for a thread;
a Restore Entity from Memory operation that produces a description of a specific BRep that may be used in conjunction with the supporting interface to access operations on that specific BRep;
a Save Entity to Memory operation that produces a binary representation of the specific BRep that may be saved for later use;
a Body to Curve Vector operation that produces a collection of curve primitives from the specific BRep;
a Facet Entity operation that produces a faceted mesh that approximates the geometry and symbology of the specific BRep;
a Get Length Properties operation that computes a length or perimeter and centroid of the specific BRep when it is a planer sheet or wire body;
a Get Area Properties operation that computes an area, perimeter and centroid of the specific BRep when it is a planer sheet or solid; and
a Get Volumes Properties operation that computes a volume, area and centroid of the specific BRep when it is a solid.

14. The non-transitory electronic device readable medium of claim 11, wherein the supporting interface includes one or more operations selected from the group consisting of:
an Is Equal operation that produces a Boolean that indicates whether an input BRep refers to the same body as a specific BRep;
a Get Entity Type operation that produces the type of body of the specific BRep;
a Get Entity Range operation that produces a cuboid volume fully enclosing the volume of the specific BRep in a world coordinate system used by the infrastructure model;
a Get Local Entity Range operation that produces a cuboid volume fully enclosing the volume of the specific BRep in a local coordinate system;
a Has Curved Face or Edge operation that produces a Boolean that indicates whether any non-planer face or non-linear edge exists within the specific BRep;
a Get Entity Transform operation that discloses a transform to be applied to a body represented by the specific BRep to transform it from a local coordinate system to the world coordinate system;
a Set Entity Transform operation that sets the transform to be applied to the body represented by the specific BRep to transform it from the local coordinate system to the world coordinate system;
a Get Face Material Attachments operation that discloses any material attachments assigned to faces of the specific BRep;
a Set Face Material Attachments operation that sets material attachments to be assigned to faces of the specific BRep;
a Clone operation that produces a copy of the specific BRep;
a Change Partition operation that transfers the specific BRep into the partition of an invoking thread; and
an Is Same Structure and Geometry operation that compares input geometry and topology of an input BRep (described by an input BRep Entity) to the specific BRep.

15. A computing device configured to provide solid modeling within an open-source infrastructure modeling platform, the computing device comprising:
a processor; and
a memory coupled to the processor, wherein the memory is configured to maintain a software for a backend module of the open-source infrastructure modeling platform that when executed on the processor is operable to:
call a function of a dynamically loaded module (DLL) to obtain a pointer to an implementation of a solid modeling module built from a private repository that implements functionality to manipulate and use boundary representation bodies (BReps) that represent geometry of elements of an infrastructure model,
utilize the pointer to initialize the solid modeling module, wherein initialization includes creating a session of the solid modeling module, the session is divided into a number of individual partitions, and BReps are each assigned to one of the individual partitions, utilize an interface of the solid modeling module to request one or more partitions of the session of the solid modeling module to perform solid modeling operations on one or more BReps assigned to the respective partitions and return results, and receive the results produced by the partitions and cause update a display to a user.

16. The computing device of claim 15, wherein each partition of the session of the solid modeling module corresponds to an individual thread of the backend module.

17. The computing device of claim 15, wherein the interface of a solid modeling module includes a primary interface that provides access to operations applicable to multiple BReps and a supporting interface that provides access to operations pertaining to a specific BRep.

18. The computing device of claim 17, wherein the primary interface includes one or more types selected from the group consisting of:

an Entity Type type that indicates a type of body of a specific BRep;

a BRep Entity type that maintains a description of the specific BRep;

a Face Material Attachments type that maps rendering material properties to individual faces of the specific BRep;

a Curve Vector type that maintains a collection of curve primitives;

a Facetted Entity type that maintains faceted meshes that are an approximation of geometry and symbology;

a Thread Mark type that serves as an indication that a session is in progress, or a partition has been allocated; and an Axis-Aligned Bounding Box (AABB) type that describes a cuboid volume fully enclosing a volume with faces aligned to axes of a coordinate system.

19. The computing device of claim 17, wherein the primary interface includes one or more operations selected from the group consisting of:

an Initialize operation that configures the solid modeling module so its functionality can be used;

a Start Session operation that starts a session;

a Stop Session operation that stops a session;

an Is Session Started operation that polls whether a session is active;

a Create Main Thread Mark operation that allocates thread-local storage and initializes an error handler;

a Create Worker Thread Outer Mark operation that allocates a partition for a thread;

a Restore Entity from Memory operation that produces a description of a specific BRep that may be used in conjunction with the supporting interface to access operations on that specific BRep;

a Save Entity to Memory operation that produces a binary representation of the specific BRep that may be saved for later use;

a Body to Curve Vector operation that produces a collection of curve primitives from the specific BRep;

a Facet Entity operation that produces a faceted mesh that is an approximation of the geometry and symbology of the specific BRep;

a Get Length Properties operation that computes a length or perimeter and centroid of the specific BRep when it is a planer sheet or wire body;

a Get Area Properties operation that computes an area, perimeter and centroid of the specific BRep when it is a planer sheet or solid; and a Get Volumes Properties operation that computes a volume, area and centroid of the specific BRep when it is a solid.

20. The computing device of claim 17, wherein the supporting interface includes one or more operations selected from the group consisting of:

an Is Equal operation that produces a Boolean that indicates whether an input BRep refers to the same body as a specific BRep;

a Get Entity Type operation that produces the type of body of the specific BRep;

a Get Entity Range operation that produces a cuboid volume fully enclosing the volume of the specific BRep in a world coordinate system used by the infrastructure model;

a Get Local Entity Range operation that produces a cuboid volume fully enclosing the volume of the specific BRep in a local coordinate system;

a Has Curved Face or Edge operation that produces a Boolean that indicates whether any non-planer face or non-linear edge exists within the specific BRep;

a Get Entity Transform operation that discloses a transform to be applied to a body represented by the specific BRep to transform it from a local coordinate system to the world coordinate system;

a Set Entity Transform operation that sets the transform to be applied to the body represented by the specific BRep to transform it from the local coordinate system to the world coordinate system;

a Get Face Material Attachments operation that discloses any material attachments assigned to faces of the specific BRep;

a Set Face Material Attachments operation that sets material attachments to be assigned to faces of the specific BRep;

a Clone operation that produces a copy of the specific BRep;

a Change Partition operation that transfers the specific BRep into the partition of an invoking thread; and an Is Same Structure and Geometry operation that compares input geometry and topology of an input BRep (described by an input BRep Entity) to the specific BRep.

* * * * *

UNITED STATES PATENT AND TRADEMARK OFFICE
CERTIFICATE OF CORRECTION

| | | |
|---|---|---|
| PATENT NO. | : 12,380,642 B1 | Page 1 of 1 |
| APPLICATION NO. | : 18/213588 | |
| DATED | : August 5, 2025 | |
| INVENTOR(S) | : Paul Connelly | |

It is certified that error appears in the above-identified patent and that said Letters Patent is hereby corrected as shown below:

In the Specification

Column 4, Line 1 reads:
"Figs. 2A and 2B are is a block diagram illustrating an"
Should read:
-- Figs. 2A and 2B are a block diagram illustrating an --

In the Claims

Claim 8:
Column 14, Line 53 reads:
"returnsing graphics including the facets."
Should read:
-- returning graphics including the facets. --

Signed and Sealed this
Ninth Day of December, 2025

John A. Squires
*Director of the United States Patent and Trademark Office*